(No Model.)
A. BRUEGGER, Jr.
MANUFACTURE OF RUBBER LINED AND RUBBER COVERED HOSE.
No. 334,510. Patented Jan. 19, 1886.
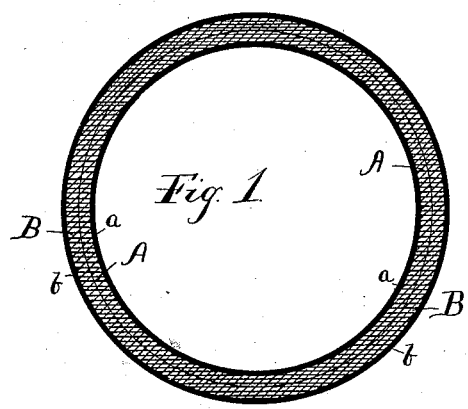
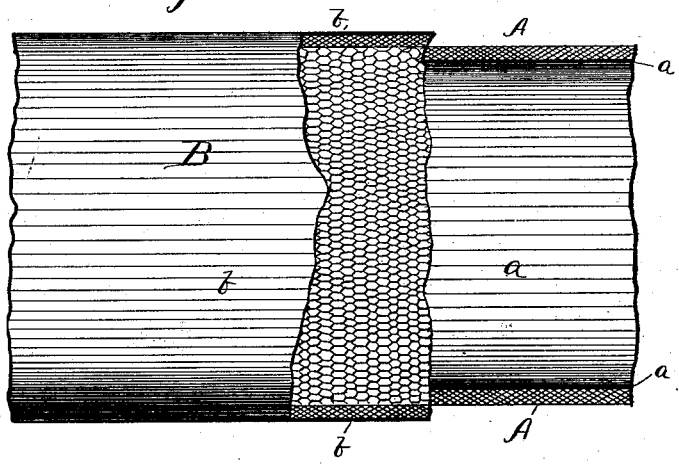
Witnesses:
Lew. E. Curtis
H. M. Munday.
Inventor:
Abraham Bruegger Jr
By Munday Evarts & Adcock
his Attorneys.

UNITED STATES PATENT OFFICE.

ABRAHAM BRUEGGER, JR., OF CHICAGO, ILLINOIS.

MANUFACTURE OF RUBBER-LINED AND RUBBER-COVERED HOSE.

SPECIFICATION forming part of Letters Patent No. 334,510, dated January 19, 1886.

Application filed November 10, 1885. Serial No. 182,349. (No specimens.)

*To all whom it may concern:*

Be it known that I, ABRAHAM BRUEGGER, Jr., a citizen of the United States, residing in Chicago, in the county of Cook and State of Illinois, have invented a new and useful Improvement in the Art of Manufacturing Rubber Hose, of which the following is a specification.

My invention relates to certain improvements in the art of manufacturing rubber hose having both an inside rubber lining and an outside rubber covering.

Heretofore rubber hose has been made of duck or other like material with an inside rubber lining and outside rubber covering, and with the several layers or plies of the duck cemented together. Rubber hose of this kind, while it has not only an inside but an outside rubber lining to protect the duck or fibrous material from becoming wet or water-soaked, and also from wear or injury when it is handled and drawn over the pavements, is still nevertheless not very durable. The reason of this is twofold—first, because such hose has in itself, from the moment of its vulcanization by the steam, the seeds of its own decay, in the moisture which is necessarily and unavoidably confined in the duck or fabric between the inside and outside rubber linings, and which can never afterward escape.

I am aware that attempts have heretofore been made to obviate this difficulty in a measure by saturating or partially saturating the duck with some preservative substance prior to the vulcanization of the hose; but such attempts have proved of but little practical utility, because the high heat to which the hose is subjected for a great length of time in the vulcanizing bath will pretty effectually dissipate or drive out most preservative substances, and because no really effective preservative substances can be used without interfering with the process of vulcanization and the cementing of the several layers of duck together into one homogeneous tube. Another reason for the short life of this kind of rubber hose is due to the fact that it has to be subjected to a high heat in the vulcanizing-chamber for so long a time, especially where the hose is made of any considerable thickness, that the duck or fabric is often liable to be rendered "dead" by the heat and its strength and structure greatly injured.

Heretofore, also, rubber hose has been made of circular or tubular fabric, woven or knitted, having an inside rubber lining. In making this kind of hose the plastic rubber sheet or sheets are first wrapped around the mandrel, and then the tubular fabric drawn over it, when it is run into the vulcanizing-chamber, and steam being admitted inside the mandrel, which is hollow and perforated, expands the rubber lining out snugly against the inner wall of the tubular fabric. In this way as the rubber to be vulcanized is simply a lining upon the inside of the tube, with which the steam comes directly in contact, the hose can be quickly vulcanized and without injury to the fabric, and, as there is no outside rubber covering, there is of course no difficulty in thoroughly drying the fabric; but this kind of hose is open to other and even more serious objections than the former, because, having no outside rubber covering, the fabric soon becomes filled with mud and dirt, and getting soaked with water every time it is used, and it being practically impossible to thoroughly dry it out every time, the hose is frequently wound up on its reel more or less moist, and soon becomes weak and unfit for use. Having no outside rubber protection, this kind of hose wears out quickly in being handled and drawn over the pavements, and is very liable to external injury. Another serious objection to this kind of hose is that it cannot be used without liability to injury in cold weather when the water freezes, because the outside fabric becoming saturated with water more or less, and then congealed, the hose becomes stiff and rigid, so that it cannot be handled or bent without breaking. It is true that these difficulties in this kind of hose can to some extent be prevented by saturating the outside fabric with oils or preservatives; but such substances will only remain in the fabric for a limited time, being exposed to the atmosphere, and at best they only afford a partial protection, while they render the hose very dirty, greasy, and disagreeable to handle.

It is the object of my invention to provide a process whereby a rubber hose having both an inside rubber lining and an outside rubber covering may be made and the fabric thoroughly dried, and also saturated with preservatives without encountering any of those objections; and to this end my invention consists in making a rubber hose by first separately making and vulcanizing an inside and an outside part, the former having an inside rubber lining and the latter having an outside rubber covering, then thoroughly drying the fabric of each part, then saturating or impregnating the fabric with preservatives, and then, finally, drawing the outside part or tube over the inside part or tube.

In practicing my improved process the inside part or tube is or may be made and vulcanized in the usual manner—that is to say, a plastic rubber sheet or sheets being wrapped around a suitable mandrel, a circular or tubular fabric, preferably woven, is drawn over it, when it is subjected to the vulcanizing process. The outside part or tube is made in a similar manner, excepting that the tubular woven or knitted fabric is first drawn over the mandrel, and the plastic rubber sheet then wrapped around it on the outside, when it is also vulcanized. The fabric on the inside of the outside tube is then thoroughly dried, as well as the fabric on the outside of the inside tube. The fabric of both the inside and the outside tubes then is or should be saturated or partially saturated with some preservative substance—such as tar, paraffine, wax, linseed-oil or cotton-oil, or other preservative substances—and then the outside tube or part is drawn over the inside tube or part. The coupling-pieces at the ends of each section of hose will effectually exclude any dirt, moisture, or water from getting in between the rubber-lined and rubber-covered tubes or parts of which the hose is composed. In this way no moisture is shut up between the inside and outside rubber linings or coverings of the hose in the process of vulcanization, and the rubber linings or coverings can be quickly vulcanized, so that there is little danger of the fabric being injured by the heat; and I am also enabled to saturate the fabric with preservatives and keep it so saturated to the proper extent, as the rubber covering on the outside effectually prevents its escape or dissipation, while the fabric is at the same time completely protected from wet or injury from the outside.

My hose also, by reason of its being composed of two distinct or separate parts or tubes, is also much more soft and flexible than the same strength or thickness of hose made in either of the old ways.

In the accompanying drawings, which form a part of this specification, and in which similar letters of reference indicate like parts, for better illustration of the process, I have shown at Figure 1 a cross-section of my improved hose as made by my process, and at Fig. 2 a side elevation showing part in longitudinal section.

In said drawings, A represents the inside fabric tube, preferably woven in circular or tubular form, and provided with the inside rubber lining, $a$, and B the outside fabric tube provided with the outside rubber covering, $b$. The fabric tubes A and B may be each made or woven of one, two, three, or more plies thickness, as may be desired; and, if desired, one or more fabric tubes having no rubber linings or coverings may be inserted between the inside rubber-lined tube A and the outside rubber-covered tube B. After the tubes A $a$ B $b$ have been separately made and vulcanized, the fabrics A B should be impregnated with a preservative substance, such as before mentioned, and then the tube B $b$ is drawn over the tube A $a$.

I claim—

1. The process or art of making an inside rubber-lined and outside rubber-covered hose, consisting in first making and vulcanizing two rubber lined or covered fabric tubes, one lined upon the inside and the other covered upon the outside, and then drawing the latter over the former, substantially as specified.

2. The art or process of making inside rubber-lined and outside rubber-covered hose, consisting in first making and vulcanizing two rubber lined or covered fabric tubes, one lined upon the inside and the other covered upon the outside, then impregnating the fabric of said tubes with a preservative, and finally drawing the one over the other, substantially as specified.

ABRAHAM BRUEGGER, Jr.

Witnesses:
H. M. MUNDAY,
JOHN W. MUNDAY.